US008576425B2

(12) United States Patent
Partridge et al.

(10) Patent No.: US 8,576,425 B2
(45) Date of Patent: Nov. 5, 2013

(54) METHOD AND SYSTEM FOR PRINTING DOCUMENTS FROM A PORTABLE DEVICE

(75) Inventors: Kurt E. Partridge, Palo Alto, CA (US); James M. A. Begole, San Jose, CA (US); Diana K. Smetters, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 953 days.

(21) Appl. No.: 12/480,590

(22) Filed: Jun. 8, 2009

(65) Prior Publication Data

US 2010/0309505 A1   Dec. 9, 2010

(51) Int. Cl.
*G06F 3/12* (2006.01)

(52) U.S. Cl.
USPC ........................................... 358/1.15

(58) Field of Classification Search
None
See application file for complete search history.

(56) References Cited

U.S. PATENT DOCUMENTS

| 5,862,321 | A | 1/1999 | Lamming |
| 6,144,997 | A | 11/2000 | Lamming |
| 6,397,261 | B1 | 5/2002 | Eldridge |
| 6,421,716 | B1 | 7/2002 | Eldridge |
| 6,430,601 | B1 | 8/2002 | Eldridge |
| 6,487,189 | B1 | 11/2002 | Eldridge |
| 6,493,760 | B1 | 12/2002 | Pendlebury |
| 6,515,988 | B1 | 2/2003 | Eldridge |
| 7,069,453 | B1 | 6/2006 | Thornton |
| 2004/0114175 | A1 | 6/2004 | Cherry |
| 2004/0172586 | A1 | 9/2004 | Ragnet |
| 2005/0099653 | A1 | 5/2005 | Kawaoka |
| 2007/0182984 | A1 | 8/2007 | Ragnet |
| 2007/0182985 | A1 | 8/2007 | Ciriza |
| 2007/0182986 | A1 | 8/2007 | Ciriza |
| 2007/0233613 | A1* | 10/2007 | Barrus et al. ............ 705/71 |
| 2008/0033955 | A1* | 2/2008 | Fujii ........................ 707/9 |
| 2010/0097661 | A1* | 4/2010 | Hoblit ...................... 358/405 |

FOREIGN PATENT DOCUMENTS

GB    2408614 A    6/2005

* cited by examiner

*Primary Examiner* — Marivelisse Santiago Cordero
*Assistant Examiner* — John Wallace
(74) *Attorney, Agent, or Firm* — Shun Yao; Park, Vaughan, Fleming & Dowler LLP

(57) ABSTRACT

One embodiment provides a system for facilitating document printing from a portable device. During operation, the system receives at an email server an email which includes an attached document. Next, the system generates at the email server a document optical code associated with the document, wherein the document optical code can be scanned and recognized by a scanning mechanism associated with a printer. Subsequently, the system attaches the optical code as an additional attachment to the email, thereby allowing a portable device to print the attached document by displaying the optical code to the scanning mechanism associated with the printer.

25 Claims, 11 Drawing Sheets

METHOD AND SYSTEM FOR PRINTING DOCUMENTS FROM A PORTABLE DEVICE

BACKGROUND

1. Field

The present disclosure relates generally to communication with peripheral devices. More specifically, the present disclosure relates to a method and system for printing documents from a portable device to any printer without discovering and loading a driver for a printer.

2. Related Art

The proliferation of portable devices is changing the way people work. For example, people receive emails with document attachments that can include large documents, presentation slides, and schedules. Typically, such attachments are difficult to read on the portable device because of limited screen sizes. At the same time, printing from the portable device is difficult for several reasons. The portable device might not have enough memory or computing power to support printer drivers. A printer driver designed for the operating system on the portable device might not be available. The portable device is often required to discover nearby printers in a new environment, which can be time-consuming and might not always be successful. Furthermore, the portable device might not have secure network access to the printer, thus introducing security concerns in the printing process.

Current solutions to printing from a portable device are complicated. A portable device must follow a complicated series of steps, including discovering the printer, downloading software drivers, creating an account, uploading documents, logging into the printer, and selecting documents. In addition, printing from a portable device requires new costly and/or retrofitted hardware, such as Bluetooth®, WiFi®, RFID, NFC, USB, and IrDA.

SUMMARY

One embodiment provides a system for facilitating document printing from a portable device. During operation, the system receives at an email server an email which includes an attached document. Next, the system generates at the email server a document optical code associated with the document, wherein the document optical code can be scanned and recognized by a scanning mechanism associated with a printer. Subsequently, the system attaches the optical code as an additional attachment to the email, thereby allowing a portable device to print the attached document by displaying the optical code to the scanning mechanism associated with the printer.

In some embodiments, the document is encrypted.

In some embodiments, the document optical code indicates a decryption key, thereby allowing the printer to decrypt the encrypted document.

In some embodiments, the document optical code is a two-dimensional bar code.

In some embodiments, facilitating document printing from a portable device involves storing a copy of the attached document at the email server.

In some embodiments, facilitating document printing from a portable device involves receiving a request from the printer to retrieve the document corresponding to the document optical code, and sending the document to the printer in response to the request.

In some embodiments, facilitating document printing from a portable device involves verifying that the printer is authorized to access the document. In some embodiments, the system generates a second optical code associated with the email body, thereby allowing the portable device to print the email by displaying the second optical code to the scanning mechanism associated with the printer.

BRIEF DESCRIPTION OF THE FIGURES

In the figures, like reference numerals refer to the same figure elements.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

DETAILED DESCRIPTION

Overview

Embodiments of the present invention solve the problem of printing a document from a portable device by obtaining and displaying a document optical code (e.g., a PrintTicket) at the portable device. The user can display the optical code to a scanner associated with a printer, which in turn can scan and recognize the optical code. Based on the information contained in the optical code, the printer (or a computer associated with the printer) can then retrieve the document from a server on a network and print the document.

Figure 1A:
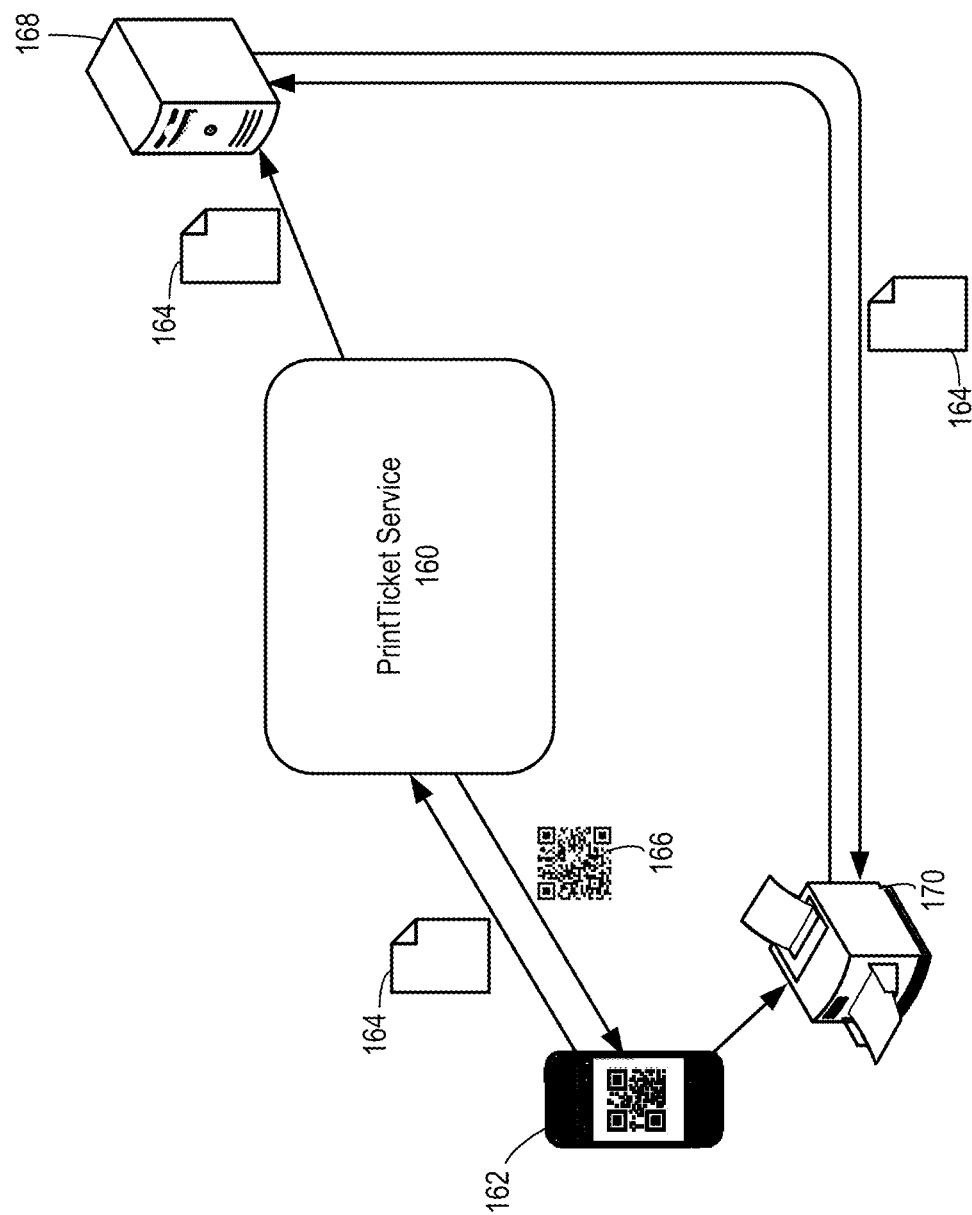
FIG. 1A illustrates an exemplary system for printing documents from a portable device in accordance with an embodiment of the present invention.

FIG. 1A illustrates an exemplary system for printing documents from a portable device in accordance with an embodiment. In this example, it is assumed that a portable device 162 has a document 164 to print. During operation, portable device 162 first sends document 164 to a PrintTicket service 160. In response, PrintTicket service 160 forwards document 164 to a document hosting server 168, which stores document 164 for subsequent retrieval. PrintTicket service 160 then generates an optical code 166, which indicates the location of document 164 on server 168. Optical code 166 is then transmitted to portable device 162. In this description, an optical code can be any optical representation of information that can be captured and recognized by any optical-sensing device, such as scanners or digital cameras. Typical optical codes include, but are not limited to: one-dimensional bar codes, two-dimensional bar codes (also called matrix codes, such as the "Quick Response" or "QR" codes), and data glyphs.

The user of portable device 162 can then display optical code 166 to a scanner associated with a printer 170. After scanning and recognizing optical code 166, printer 170 determines the location of document 164, retrieves document 164 from server 168, and prints it. In the entire process, there is no need for portable device 162 to discover printer 170 electronically or to download any printer driver. As long as the user of portable device 162 can visually locate a printer (which the user needs to do anyway for retrieving the printed documents) and displays optical code 166 to the associated scanner, the printing can be performed. Furthermore, this method is not limited to particular document formats or printer types, because it does not require any document transfer or hand-shaking process between the portable device and the printer.

A number of variations on this method can be implemented. For example, PrintTicket service 160 can be provided by a stand-alone server, by portable device 162, or by document hosting server 168. Document hosting server 168 can store document 164 at a publicly accessible location which can be identified by a universal resource locator (URL), and this URL can be encoded in optical code 166. Furthermore, the document hosting server 168 can also be part of portable device 162, which means that the document is saved on portable device 162 with an URL that can be accessed by printer 170. In addition, printer 170 can be a multi-function device (MFD) which includes a scanner. Printer 170 can also be a conventional printer coupled to a computer which is also coupled to a scanner. The computer and scanner jointly performs the scanning and recognition of optical code 166.

In one embodiment, document 164 can be encrypted, either by PrintTicket service 160 or document hosting server 168, before being stored on server 168. This way, although document 164 is stored at a publicly accessible location on server 168, its content is not viewable by the public. Correspondingly, a decryption key can be included in optical code 166. Printer 170 can then use the decryption key to decrypt the retrieved document before printing it. In addition, optical code 166 can contain access-control information, such as a user's password or PIN, to access documents stored on server 168.

The aforementioned system is only one example of the present invention. The basic idea of using an optical code to facilitate printing from a portable device without any printer discovery or driver installation can be applied in different computing environments. One such example is illustrated by the exemplary system illustrated in FIG. 1B, which facilitates printing of email attachments from a portable device in accordance with an embodiment. In this example, an email 100 addressed to a user is sent with an attached document 110 to an email server 120. A user uses a portable device 140 to download emails from email server 120. In some embodiments, the emails can be "pushed" to portable device 140 by email server 120. In response to the user's email download request, server 120 creates an optical code 130 for the attached document and adds optical code 130 as a supplemental attachment to email 105 before sending it to portable device 140. After the user views document 110 and decides to print document 110, he opens the supplemental attachment, which contains the document optical code 130. The user then places the portable device's screen, which is displaying document optical code 130, on the flatbed scanner of a multi-function device (MFD) 150. MFD 150 scans the portable device's screen, decodes optical code 130, and retrieves document 110 from email server 120. Subsequently, MFD 150 prints document 110. In this example, it is assumed that email server 120 is also the document hosting server which stores the document. In other words, the printing service described herein can be provided by a email service provider, or a wireless service provider that also offers document-hosting and/or optical-code generation.

Figure 1B:
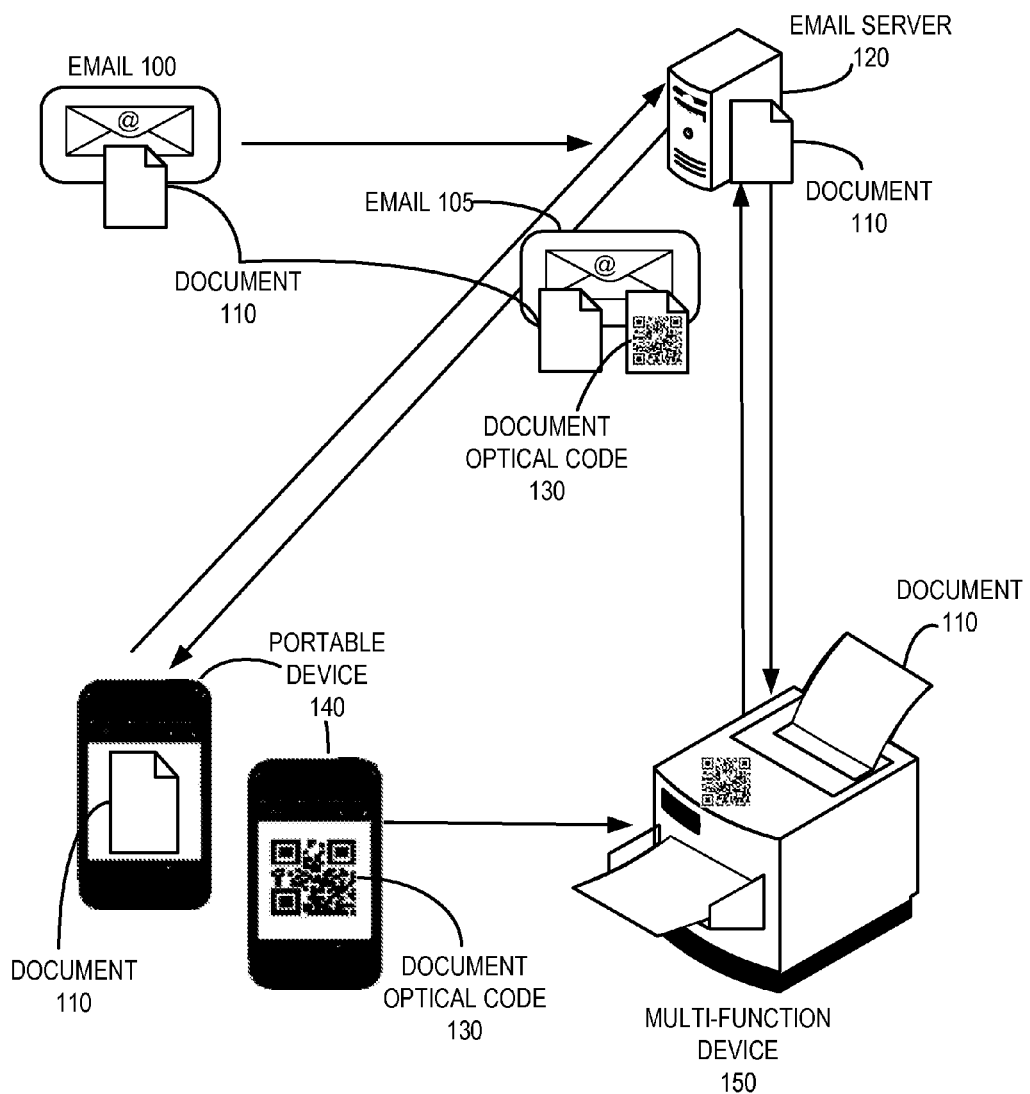
FIG. 1B illustrates an exemplary system for printing email attachments from a portable device in accordance with an embodiment of the present invention.

The systems illustrated in the examples in FIG. 1A and FIG. 1B offers several benefits. One benefit is that the system is easy to understand. For example, the system does not involve a printer discovery procedure and does not require stateful accounts or passwords. Another benefit is that the system is secure. As mentioned above, the optical code can contain keys to decrypt an encrypted document. The scanning operation also proves physical proximity, and hence authenticate the portable device to a certain degree. Another benefit is that the system is universal. The system works with all printers and does not require additional hardware. The system also supports all document formats. For example, a network service can convert the document to a printable format recognized by the printer.

In addition, the system supports all portable devices and can be modified to work on mobile devices with few features. The system can work with most network configurations, e.g., over a local area network (LAN), a wide-area network (WAN), a proprietary network, or the Internet. Another benefit is that the user does not need to know the printer's name/identifier, network address, or any other technical information about the printer. The user can also switch printers without requiring discovery when a particular printer is down.

Note that this disclosure uses the term "document optical code" interchangeably with "optical code," but not interchangeably with "printer optical code." Furthermore, the terms "printer" and "multi-function device" are used interchangeably in this disclosure. Functions, methods, and operations described in this disclosure to be performed by a printer or an MFD can also be performed by a computer associated with the printer or MFD.

Printing from a Portable Device

Figure 2:
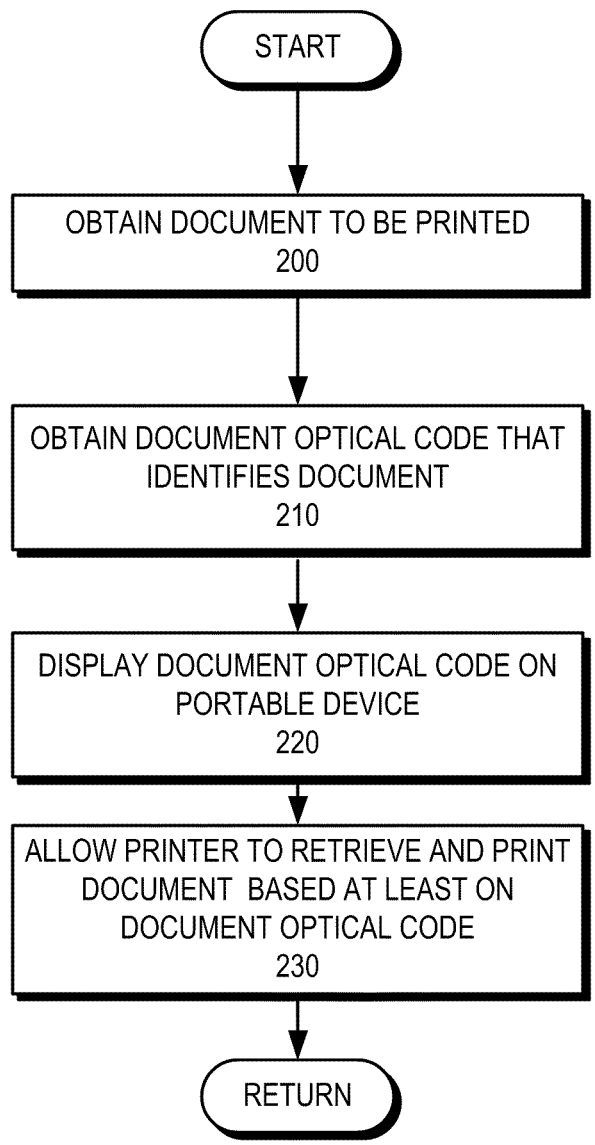
FIG. 2 presents a flow chart illustrating the process of printing email attachments from a portable device in accordance with an embodiment of the present invention.

FIG. 2 presents a flow chart illustrating the process of printing email attachments from a portable device in accordance with an embodiment. During operation, the portable device obtains a document to be printed (operation 200). Next, the portable device obtains a document optical code that identifies the document (operation 210). Subsequently, the portable device displays the document optical code on the portable device (operation 220). The portable device displays the optical code in such a way that the optical code can be scanned and recognized by a scanner associated with a printer. Next, the portable device allows the printer to retrieve and print the document based at least on the document optical code (operation 230).

The portable device can be a mobile (cellular) phone, a handheld computer, a "palmtop," a pocket-sized computing device with a display screen with a touch input or a miniature keyboard, a personal digital assistant, a smartphone, an enterprise digital assistant, a device that can read optical codes, a notebook personal computer, an ultra-mobile personal computer, or other type of mobile device.

As explained in the description in conjunction with FIG. 1A, the document can be stored in a repository located on a server. The optical code can indicate a location in the repository corresponding to the document. The repository can be hosted on the portable device or on a remote server (i.e., outside of the portable device and printer). The printer can retrieve the document using the location indicated in the optical code.

Document Identification

Embodiments of the present invention can use various methods to identify the document. The system can use document fingerprinting to identify the document, where the contents of the document can be used to find a document with corresponding content. Document fingerprinting involves mapping one or more subsets of document features (e.g., strings, sentences, paragraphs, pages) to a fingerprint, which can be one or more numerical values.

The system can use an optical code embedded with steganographic techniques to identify the document. One way to embed the optical code is to modify the graphics of the document text so that the graphics contain an identifier of the document. For example, the serifs of characters in the text font or the kerning (character space) or other visual attributes of the text font can be modulated to embed an identifier. The text can also be rendered with data glyphs or other optical digital encoding schemes.

The system can use an optical code to identify the document. The optical code can contain the location of the document in a server for index-based retrieval, or an identifier associated with the content of the document for content-based retrieval. For example, the system can use a Quick Response (QR) code, which is a two-dimensional bar code. The system can also use data glyphs as an optical code. More generally, the system can use as an optical code any visual representation of symbols or codes to identify the document.

The system can use a scan of the portable device's display to identify one or more electronic files (e.g., a folder) to print. This enables the user to print multiple files with one scan.

User Identification

In one embodiment of the present invention, the system can identify the user who is generating the print job in such a way that the printing transaction can be metered for business accounting. The system can use various methods for this identification, including logging into an account via the MFDs interface controls and an optical code. The optical code can contain information, such as user identification and a cost center, to meter the print transaction. The MFD can also require a customer to enter billing information. The portable device can embed billing information, such as a credit card number or an account number, into the optical code.

Access Control of Document Retrieval

Embodiments of the present invention can control who can access and print specific documents. The system can generate a one-time-use optical code based at least on a user identifier and a unique document identifier and include it in the document optical code. The user identifier can include a username and password, digital certificates, or other authentication information. In general, any access control method can be used to control who can access and print specific documents.

Inherently, the system uses the physical proximity between the printer and the user who is presenting the optical code to restrict access to the document only to the printer that receives the optical code. In contrast, if anyone could print to the printer merely by sending an email (as implemented in some existing environments), the system could experience a denial-of-service attack from a flood of printing requests.

In some embodiments, the system can accept only those optical codes that were generated by users from an acceptable network, such as within the WiFi network hosted by a corporation. The system can determine the identity of the user by inspecting the Media Access Control (MAC) address of the requesting machine. The system can then determine printing permission by white-listing or black-listing certain MAC addresses.

The system can also control who can access and print specific documents by only accepting optical codes that have been generated by a trusted optical code generator. A trusted optical code generator can be trusted to disclose the identity of the user who requested the optical code. In short, the optical code generating process determines who can access and print specific documents and not the network gating the process. In further embodiments, the system can enforce access control by determining that the document repository from which the document is obtained is within a local area network. For example, the printing user can be local (the repository could be on the portable device), or the printing user could have a local representative who relays network traffic.

Furthermore, the system can enforce access control by putting electronic files into a service from which the MFD can retrieve files. For example, users can explicitly upload a file to a content management service (e.g., Docushare®). The file could have been originated on a network service (e.g., Google Docs®, ThinkFree Office®). Alternatively, an email server can post attachments to the network content management service.

Printing from a Printer Lacking Scanning Capability

If a printer is not associated with any scanning capability, the system can also be used to print document 110 as follows. A camera associated with portable device 140 can be used to take a picture of an optical code associated with the printer (denoted as a printer optical code or a "PrinterTicket"). The portable device can then send the printer optical code associated with the printer to a server to request that the server sends a document to the printer for printing. Once the printer has printed one document, the printer can then be registered for future printing.

Figure 3:
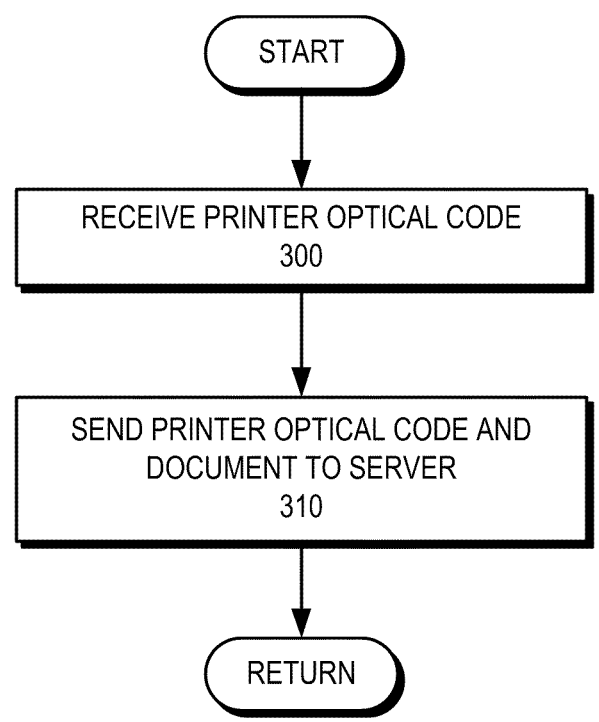
FIG. 3 presents a flow chart illustrating the process of receiving a printer optical code which identifies a printer and sending the printer optical code and document in accordance with an embodiment of the present invention.

FIG. 3 presents a flow chart illustrating the process of printing from a printer lacking scanning ability in accordance with an embodiment. During operation, a portable device receives a printer optical code (operation 300). This printer optical code can be attached to the printer and be scanned by the portable device. Next, the portable device sends the printer optical code and the document to the server (operation 310). The server then sends the document to the printer which is identified by the printer optical code.

Document Server

Figure 4:
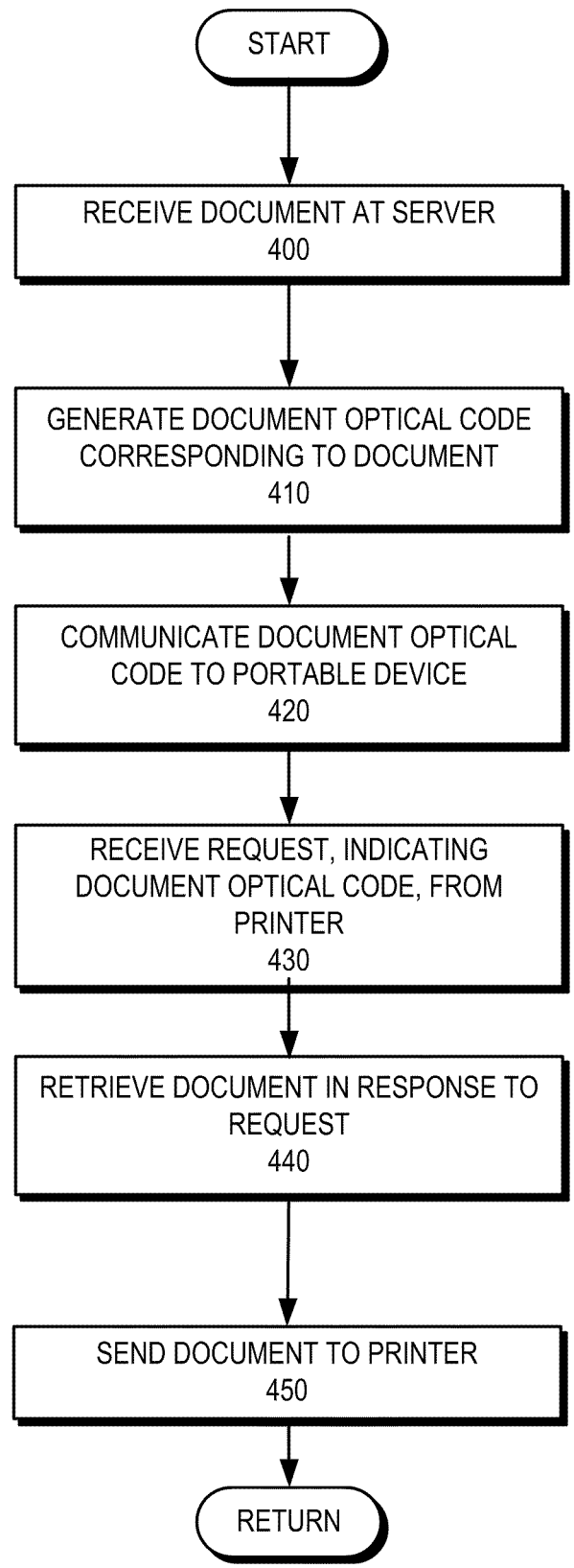
FIG. 4 presents a flow chart illustrating the process of facilitating document printing from a portable device in accordance with an embodiment of the present invention.

The document server can receive and store the document, can generate an optical code corresponding to the document, and can respond to requests for the document based on the optical code. FIG. 4 presents a flow chart illustrating the process of facilitating document printing from a portable device in accordance with an embodiment. During operation, the document server receives the document at (operation 400). Next, the document server optionally generates an optical code corresponding to the document (operation 410). Subsequently, the document server communicates the document optical code to the portable device (operation 420). Next, the document server receives a request, which indicates the document optical code, from the printer (operation 430). The document server then retrieves the document in response to the request (operation 440), and sends the document to the printer (operation 450). Note that the document server can be encapsulated in the portable device.

Controlling Access to the Document

Figure 5:
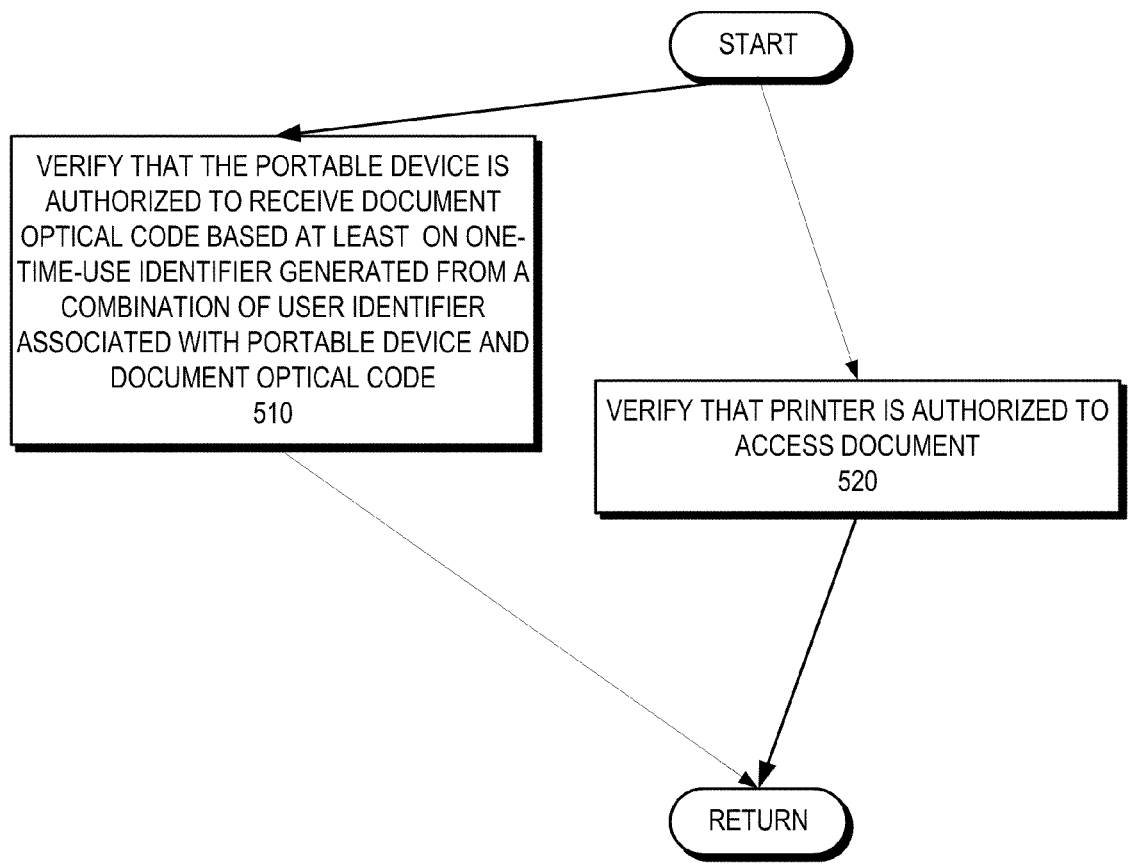
FIG. 5 illustrates the process of controlling access to the document in accordance with an embodiment of the present invention.

FIG. 5 illustrates the process of controlling access to the document in accordance with an embodiment. During operation, the system can control access to the document by verifying that the portable device is authorized to receive the document optical code based at least on a one-time-use identifier generated from a combination of a user identifier associated with the portable device and the document optical code (operation 510). The system can further verify that the printer is authorized to access the document (operation 520).

PrintTicket Email Server

Figure 6:
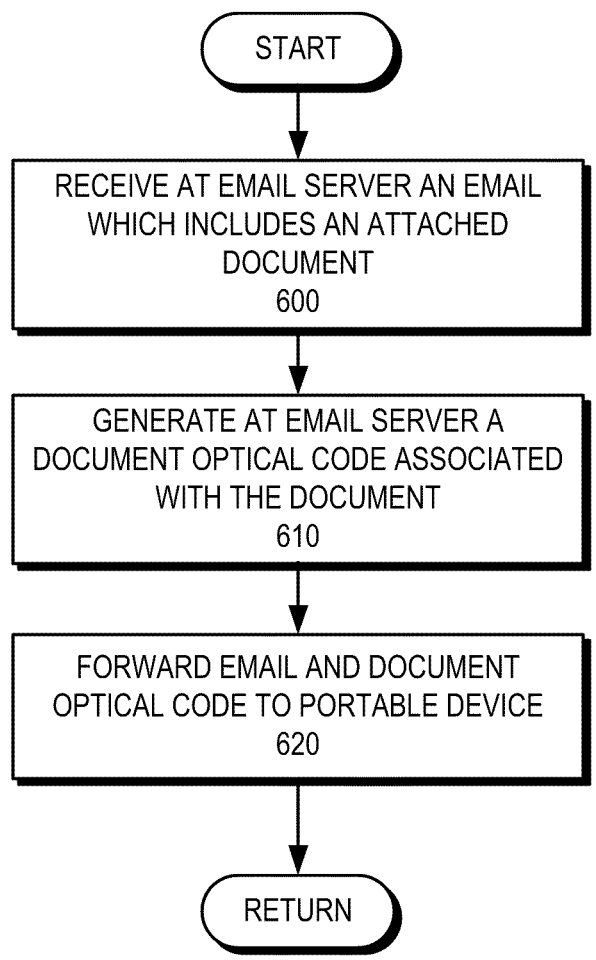
FIG. 6 presents a flow chart illustrating the process of facilitating document printing from a portable device in accordance with an embodiment of the present invention.

The PrintTicket email server can receive an email with an attached document and generate a new attachment with an optical code corresponding to the attached document. FIG. 6 presents a flow chart illustrating the process of facilitating document printing from a portable device in accordance with an embodiment (i.e., which involves a PrintTicket email server). During operation, the email server receives an email which includes an attached document (operation 600). Next, the email server generates an optical code associated with the document (operation 610). The optical code can be scanned and recognized by a scanning mechanism associated with a printer. Subsequently, the email server forwards the email and the optical code to the portable device (operation 620). This attached optical code allows the portable device to print the attached document by displaying the optical code to the scanning mechanism associated with the printer.

Figure 7:
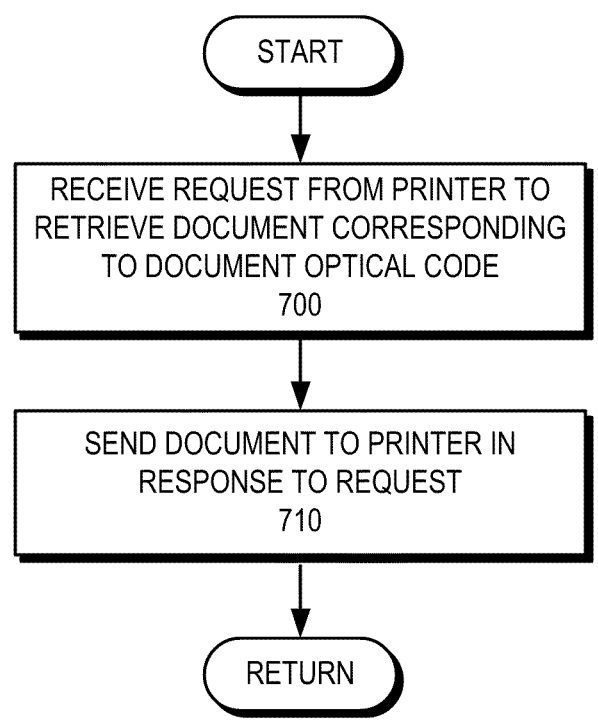
FIG. 7 presents a flow chart illustrating the process of receiving a request from the printer to retrieve a document corresponding to the document optical code and sending the document to the printer in response to the request, in accordance with an embodiment of the present invention.

FIG. 7 presents a flow chart illustrating the process of receiving a request from the printer to retrieve a document corresponding to the document optical code (operation 700) and sending the document to the printer in response to the request (operation 710), in accordance with an embodiment.

System Variations

The system supports several variations. In one variation, the mobile device can be an electronic reader or any other device using e-ink (i.e., a passive reflective) display. In further embodiments, the scanner can adjust its illumination level based on recognizing that what is being scanned is a display of a portable device. The system can support printing the document optical code directly to paper (e.g., when the user does not have a device to store the document optical code), thus enabling the user to use the printed optical code in the scanner instead of the mobile device. The user can also email a document to a service which sends back a document optical code, which the user can then use in the scanner of the MFD. In some embodiments, the MFD generates and displays a one-time-use optical code that embeds a public key and an identifier of the printer. The user can take a picture of the optical code with his portable device and use that picture to send an electronic file to the identified printer via a network service. In addition, the mobile device can use the public key to encrypt the file so that the network service cannot see the content. The MFD can use the private half of the key to decrypt the file when received.

Portable Device for Printing a Document

Figure 8:
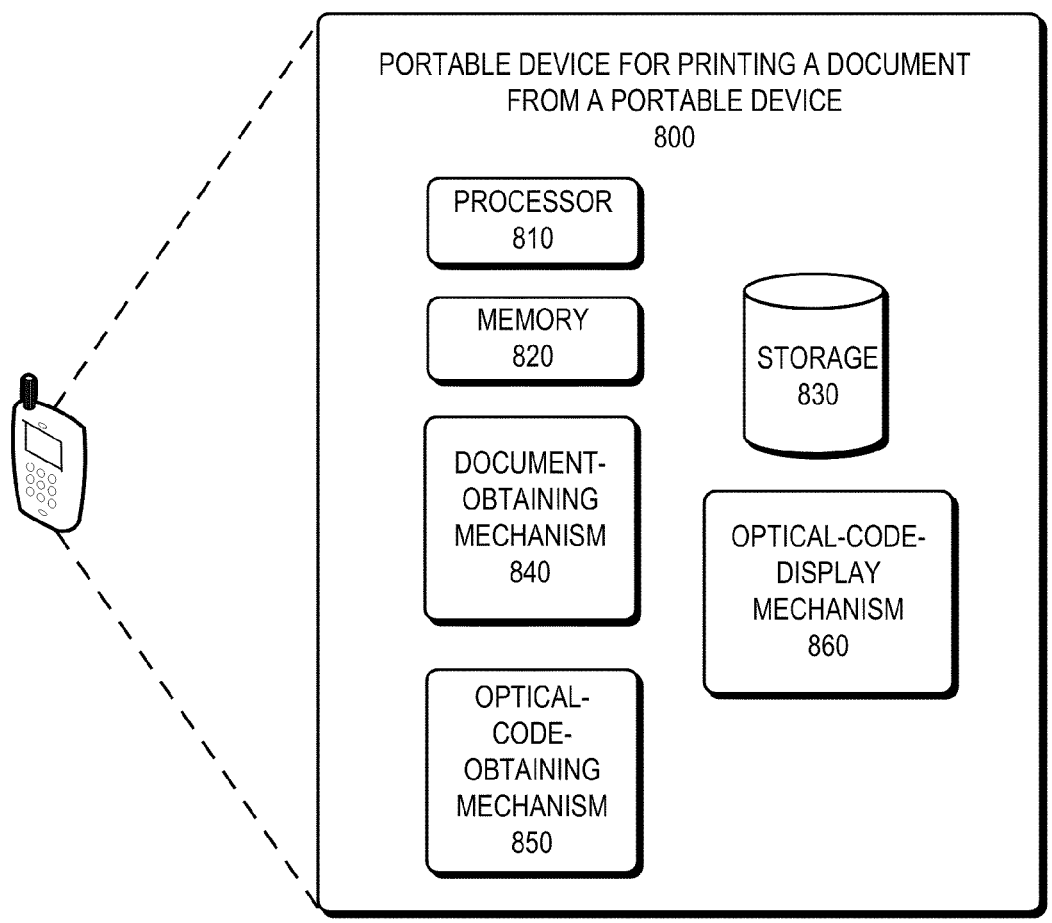
FIG. 8 illustrates an exemplary portable device for printing a document from a portable device in accordance with an embodiment of the present invention.

FIG. 8 presents an exemplary portable device for printing a document from a portable device in accordance with an embodiment. Portable device 800 for printing a document from a portable device comprises a processor 810, a memory 820, a storage 830, a document-obtaining mechanism 840, an optical-code-obtaining mechanism 850, and an optical-code display mechanism 860, all of which can be in communication with each other through various means.

Storage 830 stores programs to be executed by processor 810. Specifically, storage 830 stores a program that implements a system (application) for printing a document from a portable device. During operation, the application program can be loaded from storage 830 into memory 820 and executed by processor 810. As a result, portable device 800 for printing a document from a portable device can perform the functions described above.

During operation, document-obtaining mechanism 840 receives a document. Next, optical-code-obtaining mechanism 850 obtains an optical code corresponding to the document. Subsequently, optical-code-display mechanism 860 displays the optical code to a printer. As a result, the printer can retrieve and print the document based on the optical code.

Document Server for Facilitating Document Printing from a Portable Device

Figure 9:
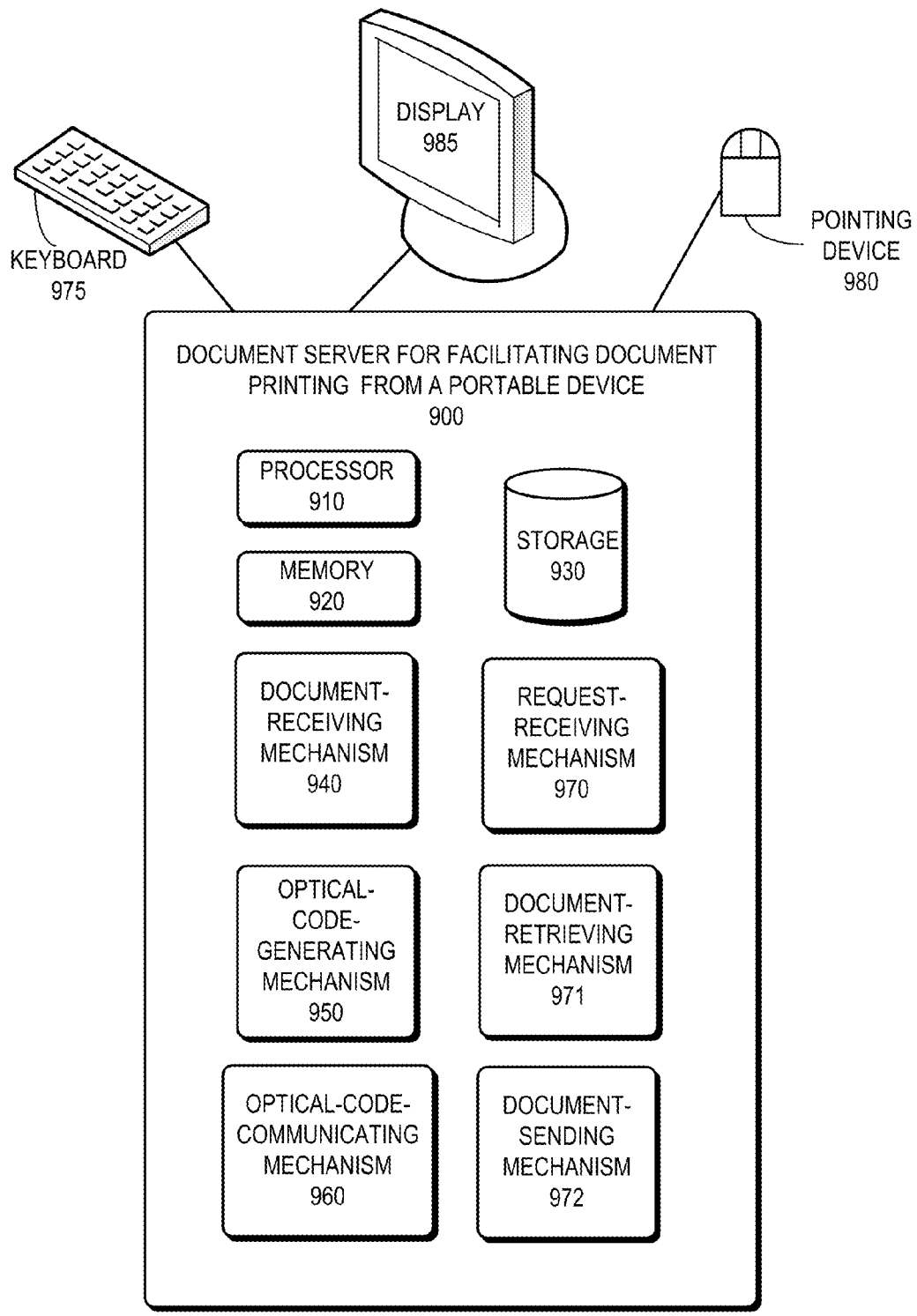
FIG. 9 illustrates an exemplary document server for facilitating document printing from a portable device in accordance with an embodiment of the present invention.

FIG. 9 presents an exemplary document server for facilitating document printing from a portable device in accordance with an embodiment. document server 900 for printing a document from a portable device comprises a processor 910, a memory 920, a storage 930, a document-receiving mechanism 940, an optical-code-generating mechanism 950, an optical-code-communicating mechanism 960, a request-receiving mechanism 970, a document-retrieving mechanism 971, and a document-sending mechanism 972.

Storage 930 stores programs to be executed by processor 910. Specifically, storage 930 stores a program that implements a system (application) facilitating document printing from a portable device. During operation, the application program can be loaded from storage 930 into memory 920 and executed by processor 910. As a result, apparatus 900 for facilitating document printing from a portable device can perform the functions described above. Apparatus 900 for facilitating document printing from a portable device can be coupled to an optional display 985, keyboard 975, and pointing device 980.

In an embodiment, processor 910 activates document-receiving mechanism 940 to receive documents from a portable device. Next, processor 910 activates optical-code-generating mechanism 950 and supplies it with the document. Subsequently, optical-code-communicating mechanism 960 sends the generated optical code to the portable device. Next, request-receiving mechanism 970 receives a request from a printer. In response, document-retrieving mechanism 971 retrieves the document, and document-sending mechanism 972 sends the document to the printer.

Email Server for Facilitating Document Printing from a Portable Device

Figure 10:
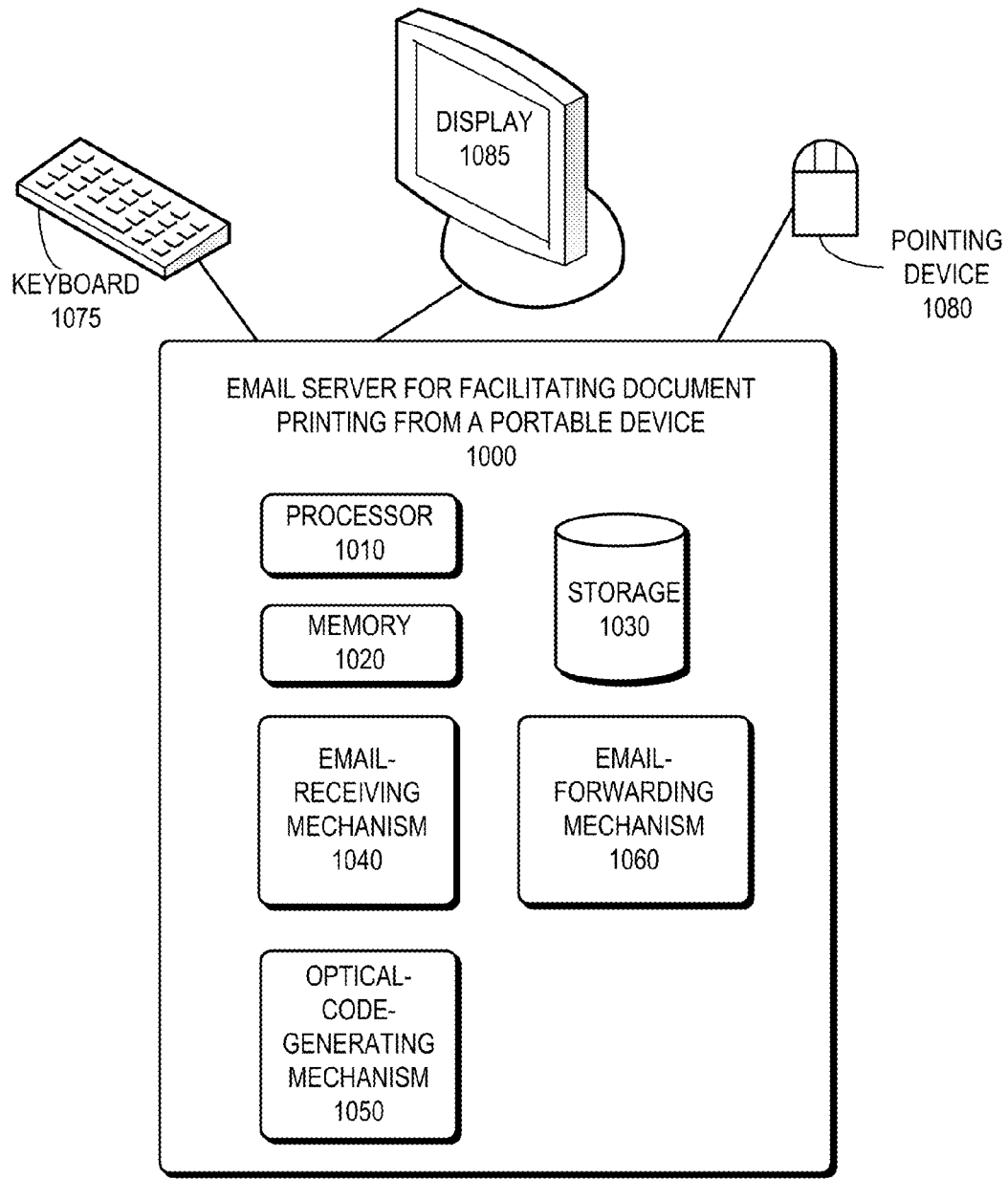
FIG. 10 illustrates an exemplary email server for facilitating document printing from a portable device in accordance with an embodiment of the present invention.

FIG. 10 presents an exemplary email server for facilitating document printing from a portable device in accordance with an embodiment. Email server 1000 for printing a document from a portable device includes a processor 1010, a memory 1020, a storage 1030, an email-receiving mechanism 1040, an optical-code-generating mechanism 1050, and an email-forwarding mechanism 1060.

Storage 1030 stores programs to be executed by processor 1010. Specifically, storage 1030 stores a program that implements a system (application) facilitating document printing from a portable device. During operation, the application program can be loaded from storage 1030 into memory 1020 and executed by processor 1010. As a result, email server 1000 can perform the functions described above. Email server 1000 for facilitating document printing from a portable device can be coupled to an optional display 1085, keyboard 1075, and pointing device 1080.

During operation, email-receiving mechanism 1040 receives an email with an attached document. Next, optical-code-generating mechanism 1050 generates an optical code corresponding to the document attached to the email and attaches the optical code to the email as an additional attachment. Subsequently, email-forwarding mechanism 1060 forwards the email with the additional attachment to the user's portable device.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating document printing from a portable device, wherein the computer includes a processor, the method comprising:
   receiving, by an email server, an email which includes an attached document;
   in response to receiving the email, generating, by the email server, an updated email which includes a document optical code for the attached document, wherein generating the updated email involves:
      generating the document optical code based on content of the attached document, wherein the document optical code is associated with the document, and wherein a printer is configured to use a scanning mechanism to scan the document optical code to retrieve the attached document; and
      generating the updated email to include the original attached document and an additional email attachment, wherein the additional email attachment includes the document optical code and is separate from the original attached document; and
   sending the updated email, which includes the original attached document and the additional email attachment, to the portable device, thereby facilitating the portable device to print the original attached document at the printer by displaying the document optical code to the scanning mechanism associated with the printer.

2. The method of claim 1, wherein the document is encrypted.

3. The method of claim 2, wherein the document optical code indicates a decryption key, thereby allowing the printer to decrypt the encrypted document.

4. The method of claim 1, wherein the document optical code is a two-dimensional bar code.

5. The method of claim 4, further comprising storing a copy of the attached document at the email server.

6. The method of claim 5, further comprising:
   receiving a request from the printer to retrieve the document corresponding to the document optical code; and
   sending the document to the printer in response to the request.

7. The method of claim 6, further comprising verifying that the printer is authorized to access the document.

8. The method of claim 1, further comprising generating a second optical code associated with the email body, thereby allowing the portable device to print the email by displaying the second optical code to the scanning mechanism associated with the printer.

9. The method of claim 1, wherein the document optical code comprises a document fingerprint, which comprises one or more numerical values mapped to one or more subsets of document features.

10. An apparatus for facilitating document printing from a portable device, the apparatus comprising:
   an email-receiving mechanism configured to receive, at an email server, an email which includes an attached document;
   an optical-code-generating mechanism configured to, in response to the email-receiving mechanism receiving the email, generate a document optical code based on content of the attached document, wherein the document optical code is associated with the document, and wherein a printer is configured to use a scanning mechanism to scan the document optical code to retrieve the attached document;
   an email-updating mechanism configured to, in response to the optical-code-generating mechanism generating the document optical code, generate an updated email which includes the original attached document and an additional email attachment, wherein the additional email attachment includes the document optical code and is separate from the original attached document; and
   an email-sending mechanism configured to send the updated email, which includes the original attached document and the additional email attachment, to the portable device, thereby facilitating the portable device to print the attached document at the printer by displaying the optical code to the scanning mechanism associated with the printer.

11. The apparatus of claim 10, wherein the document is encrypted.

12. The apparatus of claim 11, wherein the document optical code indicates a decryption key, thereby allowing the printer to decrypt the encrypted document.

13. The apparatus of claim 10, wherein the document optical code is a two-dimensional bar code.

14. The apparatus of claim 13, further comprising a storage mechanism configured to store a copy of the attached document at the email server.

15. The apparatus of claim 14, further comprising:
a request-receiving mechanism configured to receive a request from the printer to retrieve the document corresponding to the document optical code; and
a document-sending mechanism configured to send the document to the printer in response to the request.

16. The apparatus of claim 15, further comprising a verification mechanism configure to verify that the printer is authorized to access the document.

17. The apparatus of claim 10, wherein the optical-code-generation mechanism is further configured to generate a second optical code associated with the email body, thereby allowing the portable device to print the email by displaying the second optical code to the scanning mechanism associated with the printer.

18. A computer-readable storage device storing instructions that when executed by a computer cause the computer to perform a method for facilitating document printing from a portable device, the method comprising:
receiving, at an email server, an email which includes an attached document, wherein the email is to be forwarded to a portable device;
in response to receiving the email, generating an updated email which includes a document optical code for the attached document, wherein generating the updated email involves:
generating the document optical code based on content of the attached document, wherein the document optical code is associated with the document, and wherein a printer is configured to use a scanning mechanism to scan the document optical code to retrieve the attached document; and
generating the updated email to include the original attached document and an additional email attachment, wherein the additional email attachment includes the document optical code and is separate from the original attached document; and
sending the updated email, which includes the original attached document and the additional email attachment, to the portable device, thereby facilitating the portable device to print the attached document at the printer by displaying the optical code to the scanning mechanism associated with the printer.

19. The storage device of claim 18, wherein the document is encrypted.

20. The storage device of claim 19, wherein the document optical code indicates a decryption key, thereby allowing the printer to decrypt the encrypted document.

21. The storage device of claim 18, wherein the document optical code is a two-dimensional bar code.

22. The storage device of claim 21, wherein the method further comprises storing a copy of the attached document at the email server.

23. The storage device of claim 22, wherein the method further comprises:
receiving a request from the printer to retrieve the document corresponding to the document optical code; and
sending the document to the printer in response to the request.

24. The storage device of claim 23, wherein the method further comprises verifying that the printer is authorized to access the document.

25. The storage device of claim 18, wherein the method further comprises generating a second optical code associated with the email body, thereby allowing the portable device to print the email by displaying the second optical code to the scanning mechanism associated with the printer.

* * * * *